United States Patent
Smith et al.

(10) Patent No.: US 7,580,777 B2
(45) Date of Patent: Aug. 25, 2009

(54) MODULAR AIRCRAFT CONTROL SYSTEM AND METHOD

(75) Inventors: Timothy Smith, Gosberton (GB); James Daas, London (GB)

(73) Assignee: Ultra Electronics Limited, Greenford, Middlesex (GB)

( * ) Notice: Subject to any disclaimer, the term of this patent is extended or adjusted under 35 U.S.C. 154(b) by 0 days.

(21) Appl. No.: 11/460,769

(22) Filed: Jul. 28, 2006

(65) Prior Publication Data

US 2007/0112480 A1 May 17, 2007

Related U.S. Application Data

(63) Continuation of application No. PCT/GB2005/000061, filed on Jan. 12, 2005.

(51) Int. Cl.
*B64C 13/50* (2006.01)

(52) U.S. Cl. .................. 701/3; 244/134 D; 244/134 R; 322/39

(58) Field of Classification Search .............. 701/3; 244/134 R, 134 E, 76 R, 134 D; 322/39, 322/44, 46; 219/703; *B64C 13/00, 13/50*
See application file for complete search history.

(56) References Cited

U.S. PATENT DOCUMENTS

| | | | |
|---|---|---|---|
| 3,673,488 A * | 6/1972 | Spiller | 322/28 |
| 4,156,151 A | 5/1979 | Borroni | |
| 4,283,664 A * | 8/1981 | Ebert | 318/400.01 |
| 4,292,502 A | 9/1981 | Adams | |
| 4,410,794 A | 10/1983 | Williams | |
| 4,514,619 A | 4/1985 | Kugelman | |
| 4,895,322 A | 1/1990 | Zieve | |
| 5,296,853 A | 3/1994 | Federow et al. | |
| 5,391,975 A * | 2/1995 | Okubo | 322/28 |
| 5,657,951 A * | 8/1997 | Giamati | 244/134 D |
| 5,808,371 A | 9/1998 | Kon'i et al. | |
| 5,808,880 A * | 9/1998 | Marvin | 363/37 |
| 5,835,364 A * | 11/1998 | DeWinter et al. | 363/45 |
| 6,027,075 A | 2/2000 | Petrenko | |
| 6,181,235 B1 * | 1/2001 | Smith | 318/696 |
| 6,207,940 B1 * | 3/2001 | Feher et al. | 219/679 |
| 6,237,874 B1 * | 5/2001 | Rutherford et al. | 244/134 E |
| 6,330,986 B1 * | 12/2001 | Rutherford et al. | 244/134 E |
| 6,420,797 B1 | 7/2002 | Steele et al. | |
| 6,427,946 B1 | 8/2002 | Petrenko | |
| 6,753,513 B2 * | 6/2004 | Goldberg et al. | 219/497 |
| 6,870,139 B2 * | 3/2005 | Petrenko | 219/482 |
| 7,175,136 B2 * | 2/2007 | Shah et al. | 244/134 R |
| 7,432,686 B2 * | 10/2008 | Erdman et al. | 322/44 |

FOREIGN PATENT DOCUMENTS

| | | |
|---|---|---|
| DE | 2824039 | 12/1978 |
| EP | 0051849 A1 | 5/1982 |
| EP | 0680878 | 11/1995 |
| EP | 1204012 | 5/2002 |
| GB | 2205009 A | 11/1988 |

* cited by examiner

*Primary Examiner*—Tuan C To
(74) *Attorney, Agent, or Firm*—Dickstein Shapiro LLP (57) ABSTRACT

An aircraft system for control of the application of power to a plurality of devices in the aircraft comprises a plurality of local control modules. Each local control module controls the application of the power to the group of at least one device. A central control system communicates with and controls the local control modules.

25 Claims, 8 Drawing Sheets

Fig 9 ively filing date of Jan. 12, 2005, entitled, "MODULAR
MODULAR AIRCRAFT CONTROL SYSTEM AND METHOD

CROSS-REFERENCE TO RELATED APPLICATION

This application is a continuation of a co-pending international application PCT/GB 2005/000061, with an international filing date of Jan. 12, 2005, entitled, "MODULAR AIRCRAFT ICE PROTECTION SYSTEM AND METHOD", and international application GB/0402093.9, with a filing date of Jan. 30, 2004, entitled, "MODULAR AIRCRAFT POWER CONTROL SYSTEM AND METHOD" both of which is incorporated by reference herein in its entirety.

TECHNICAL FIELD

The present invention generally relates to a modular aircraft control system and method. One particular aspect of the present invention relates to a modular aircraft ice protection system and method

BACKGROUND OF THE INVENTION

The majority of modern large aircraft use engine bleed air to heat the wing in order to provide ice protection. There is now a demand for high efficiency aircraft. This will result in the elimination of bleed air systems since bleed air contributes significantly to aircraft engine inefficiency.

Conventional control of electrical systems requires that all loads are fed from a common power bus, each with its own means of electrical isolation in the form of a contact breaker (CB) which is normally located in or near to the cockpit. With a significant number of loads the weight of the power distribution system becomes significant and impacts on the aircraft's efficiency.

An example of a prior art ice prevention system is disclosed on U.S. Pat. No. 4,895,322. The system comprises a plurality of self-contained modules for de-icing areas of the leading edges of the wings of an aircraft. Each module receives power from an ac power source and drives a magnetic pulse actuator to de-ice an area of the leading edge of the wing. Each module acts in a self-contained manner automatically without any central control. Thus whilst this system provides a benefit of being modular, it suffers from the disadvantage of lacking the ability for central control of the de-icing of areas of the aircraft e.g. to enable separate or coordinated control of the de-icing of areas.

It is therefore an object of one aspect of the present invention to provide a modular aircraft control system which uses a localized modular control to provide a control system which improves the aircraft's efficiency.

SUMMARY OF THE INVENTION

Embodiments of the present invention provide an apparatus and method for modular aircraft control.

Briefly described, in architecture, one embodiment of the system, among others, can be implemented as follows. An aircraft system for control of the application of power to a plurality of devices in the aircraft comprises a plurality of local control modules. Each local control module controls the application of the power to the group of at least one device. A central control system communicates with and controls the local control modules.

The invention may also be conceptualized as a modular aircraft control method, which among others, can be implemented as follows. The method controls the application of power to a plurality of devices in the aircraft, by (1) controlling the application of said power to the group of at least one device using a plurality of local control modules; (2) providing power to said local control modules using a power line; and (3) communicating with and controlling said local control modules over the power line using a central control system.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

It is an object of one aspect of the present invention to provide a modular aircraft control system which uses localized modular control to provide a control system which improves the aircraft's efficiency.

One aspect of the present invention provides an aircraft system and method for control of the application of power to a plurality of devices in the aircraft. A plurality of local control modules control the application of power to a plurality of groups of at least one device and a central control system communicates with and controls the local control modules.

In this aspect of the present invention, the modular aircraft control system provides a more efficient system enabling modular control of devices in the aircraft. The modular control allows for the separate or coordinated control of the devices e.g. ice protection elements in an ice protection system.

The present invention is particularly suited, in one embodiment, to the control of the application of high power from an aircraft generator system. In this embodiment, the local control modules control the switching of the high power to the aircraft devices under the control of the central control system. In this embodiment the use of local control modules provides for a flexible light-weight system since the local control modules can all be provided with high power from the same high power line fed to each of the local control modules provided in the vicinity of the devices to be controlled. Since such high power lines are of heavy gauge in order to carry the high power, the use of a single line instead of multiple lines fed from the fuselage e.g. the cockpit, provides a considerable weight saving. This is the case even with the addition of the extra weight of the local control modules since these can be constructed of light-weight material and can comprise solid state devices.

In one embodiment of the present invention the local control modules are provided with power over a low power line. The low power line is powered from the central control system. In one particular embodiment, the central control system applies signals to the low power line for control of the local control modules. In one particular embodiment the power and/or the signals can be applied to the low power line inductively and can be received by each of the local control modules inductively. This has the advantage of enabling simple connectivity of modules to the line since no mechanical connections need to be made to the line to provide for electrical conductivity. It also provides for electrical isolation.

In an embodiment of the present invention, the low power line can be used as the main source of power for the local control modules, as a joint power source in conjunction with power taken from the high power line, or as a secondary or reserve power source to power taken from the high power line. The provision of the low power line provides the advantage of allowing the control system to be powered up independently of the powering of the high power line. This enables the system to be operated without the high power source being active. In the aircraft the source of the high power is generally the generator system which runs off the engines. Thus the system of this embodiment of the present invention can be operated without the need to start the engines of the aircraft in order to provide the high power. This enables testing of the system by ground crew using the aircraft's battery to power up the low power line.

The provision of the signalling between the central control system and the local control modules over the low power line in an embodiment of the present invention also provides the advantage of not requiring a separate signalling line or lines between the central control system and the local control modules.

In one embodiment of the present invention the central control system controls the local control modules to apply the power across the devices in a cyclical manner so that each device is powered only for a period of time and at any one time less than all devices are powered at the same time. This enables the power demand for the system to be reduced. Instead of switching all devices on and off together as required for the powering of the devices e.g. for ice protection, they are switched on and off in an alternating manner. This embodiment of the present invention also enables the central control system to monitor the total power demand of the devices and to switch the power using the local control modules so as to keep the total power demand substantially constant. This is advantageous since there is substantially no sudden load demand changes placed on the aircraft generator system and there are also substantially no power surges or spikes caused by the power switching operation of the local control modules.

In one embodiment of the present invention, the power has a plurality of phases. Typically a 3-phase supply is provided from an aircraft generator system. However the present invention is not limited to 3 phases and is equally applicable to any number of phases and to dc systems. In this embodiment the local control modules are provided in groups: the number of local control modules in a group being equal to the number of phases of the power supply to control the application of power by a respective phase of the power supply. Each group of local control modules controls the application of power to a group of devices in a controlled zone e.g. an ice protection zone. For example each local controller can control 3 devices. The power supply is 3 phases and hence 3 local control modules are provided to control a controlled zone. Thus the 3 control modules control 9 devices in all in the controlled zone. This arrangement allows for the zonal control of the application of power to the devices. In another embodiment the number of local control modules may exceed the number of phases but must always be a multiple of the number of phases. In a particular embodiment, the central control system is adapted to control the local control modules in each zone so as to substantially balance the power applied by each phase. In a further particular embodiment, the central control system is adapted to control the local control modules to apply power to each zone in a cyclical manner so that each zone is activated periodically as the power is cycled between the zones. In this embodiment the central control system can, in an embodiment, control, the local control modules so as to keep the total power applied to all the devices substantially constant.

In one embodiment of the present invention, the local control modules receive operating parameters of the devices that they are controlling. The operating parameters are sent to the central control system and used by the central control system in the control of the local control modules to control the application (e.g. the cyclical application) of power to the devices. The operating parameters can comprise any electrical property of the device such as the current and/or voltage of the applied power, capacitance, inductance or resistance, or any physical property of the device such as temperature, stress, force, velocity, or acceleration.

The present invention is suited to ice protection systems, but has utility for control of any aircraft devices that are distributed about the aircraft.

In an ice protection system in accordance with one embodiment of the present invention, the devices can comprise de-icing elements for removing ice once formed in an area an/or anti-icing elements for preventing the build up of ice in an area. In one embodiment both de-icing elements and anti-icing elements are provided and the group of devices include both. The local control module controls these separately and preferably independently. For example the anti-icing elements are preferably powered continuously or cycled as necessary to prevent the build up of ice. The de-icing elements are powered when required to remove ice. This can be powered automatically upon the detection of ice build up by one or more ice detectors, automatically with a fixed timing sequence controlled in dependence upon aircraft temperature, or manually on demand by the aircrew of the aircraft. Ice detection can be performed using any known device such as described in U.S. Pat. No. 5,296,853 (the content of which is hereby incorporated by reference).

In one embodiment of the present invention in which the control system comprises an ice protection system, the ice protection elements can comprise any known type of electrically powered elements for de-icing and/or anti-icing or a combination thereof. For example the elements can comprise magnetic force pulse elements as for example described in U.S. Pat. No. 4,895,322 (the content of which is hereby incorporated by reference), electro thermal elements (where the area is heated), or electro impulsive elements (where a large electrical pulse is applied to the area) as for example described in U.S. Pat. No. 6,427,946 and U.S. Pat. No. 6,027,075 (the contents of which are hereby incorporated by reference), or any combination thereof. The type of electrical ice protection element is not essential to the operation of any aspect of the present invention.

In one embodiment of the present invention each of the local control modules can be fitted into a housing in the aircraft. The housings contain stored information for the configuration of the module, which can be used by the module to configure the module thus enabling a standard or universal module to be used for all local control modules. The information can be provided in the housing in any convenient storage device such as a solid state memory, a tag, a bar code, or any other machine-readable device. The module can obtain the information from the storage device either by reading the storage device or by receiving the information transmitted from the storage device. For example the information can be transmitted by the storage device such as an electrical, optical, magnetic, electromagnetic (e.g. rf, or microwave) signal.

In another embodiment, the unit is conventionally mounted in the aircraft and an electrical connector for connection to the units contains the storage device. The storage device transmits the configuration information for the module as an electrical, optical, magnetic, electromagnetic (e.g. rf or microwave) signal.

One aspect of the present invention provides an aircraft system for control of the application of power to a plurality of devices in the aircraft. The system comprises a plurality of local control modules, each of which controls the application of the power to the group of at least one device; a plurality of local control module connection arrangements, each of which connects to a local control module; a communication line connected to the local control connection arrangements; and a central control system for communicating with and controlling the local control modules over the communications line. Each local control module connection arrangement includes a storage device storing information for configuring a local control module, and each local control module includes an arrangement for obtaining the information in the storage device for the configuration of the local control module. In this aspect of the present invention, each local control connection arrangement can comprise a housing to receive each local control module or a connector for example.

Figure 1:
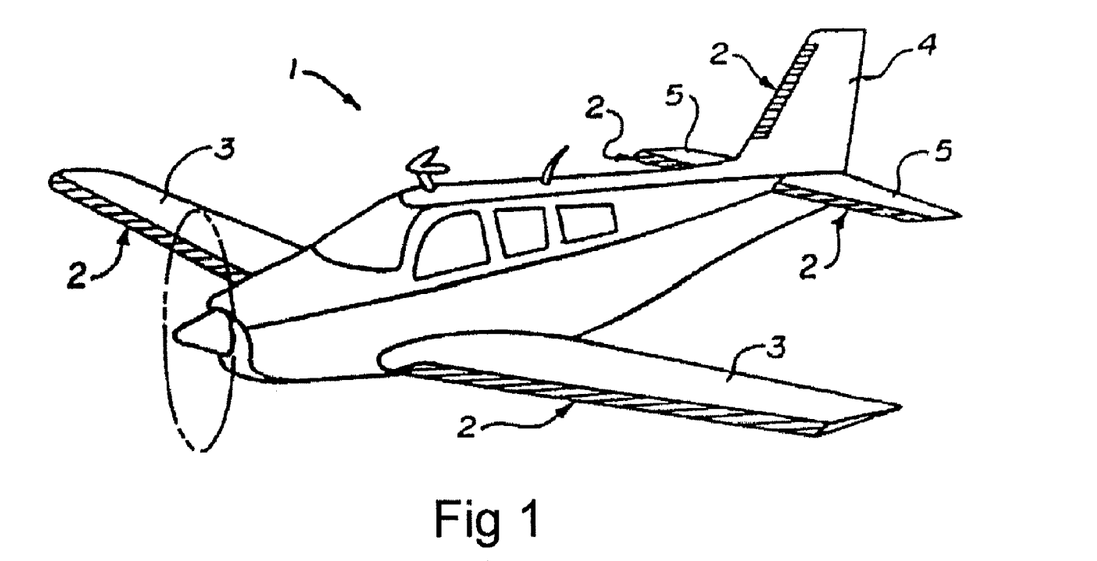
FIG. 1 is a diagram of a propeller aircraft showing the positioning of ice protection elements in accordance with one embodiment of the present invention.

FIG. 1 illustrates the application of the present invention to an ice protection system in a propeller driven aircraft 1 in one embodiment of the present invention. In such an aircraft, as is well known, the leading edges of the aircraft body are prone to ice build up. In this embodiment ice protection elements 2 are provided along the leading edges of the wings 3 and the empennage 4 and 5.

Figure 2:
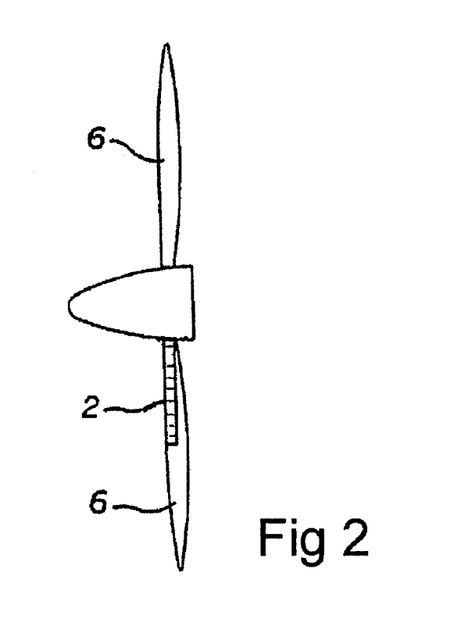
FIG. 2 is a diagram of the propeller of the aircraft of the embodiment of FIG. 1 in more detail.

In the propeller driven aircraft 1, the leading edges of the propeller 6 can accumulate ice. FIG. 2 illustrates the application of the present invention to ice protection of the propeller 6 in the embodiment of FIG. 1. In such an application the power for the elements 2 must be carried across the rotating coupling between the propeller shaft and the aircraft body. Such arrangements are well known in the art e.g. a commutation arrangement or an inductive arrangement.

Figure 3:
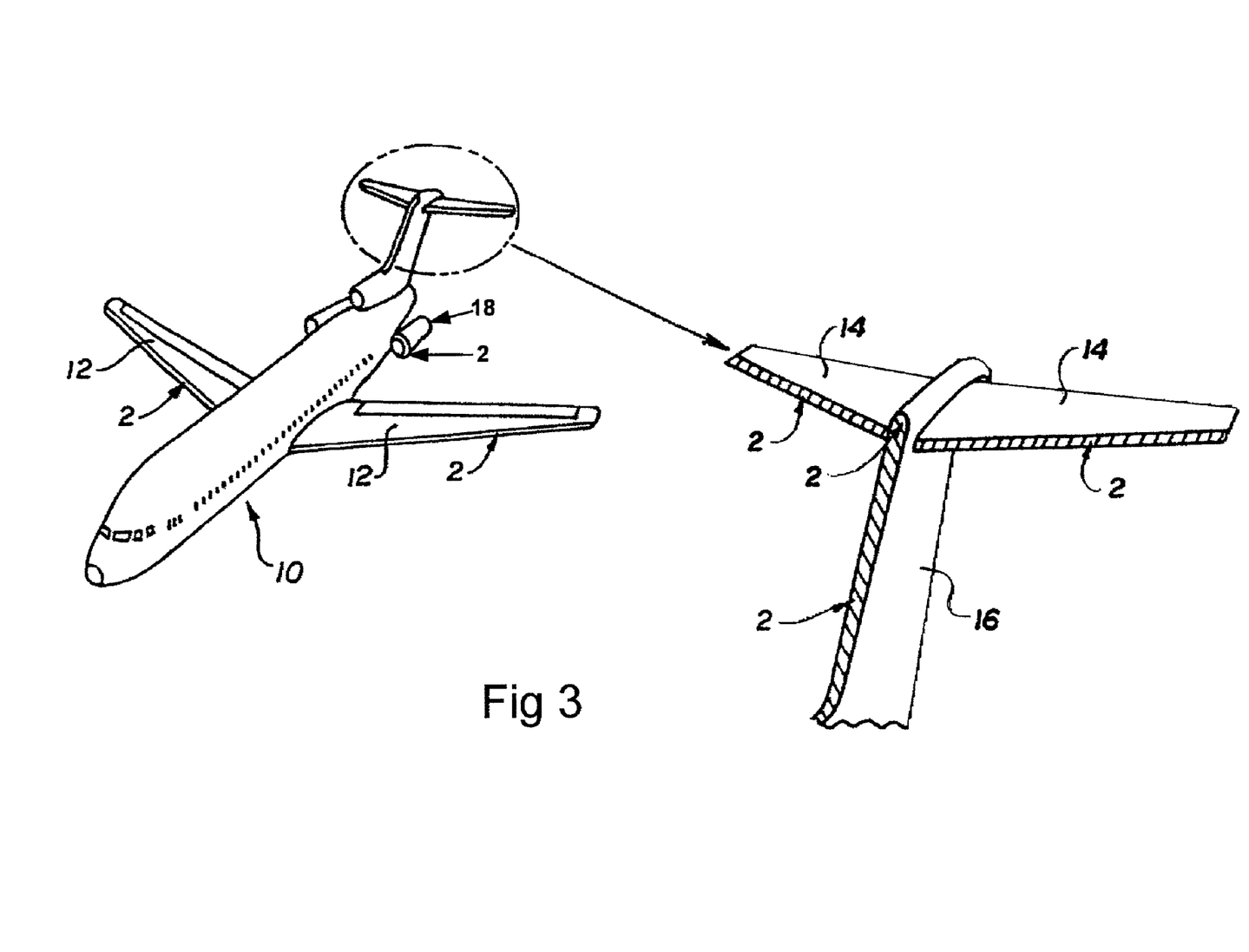
FIG. 3 is a diagram of a jet aircraft showing the positioning of ice protection elements in accordance with one embodiment of the present invention.

FIG. 3 illustrates the application of the invention to an ice protection system in a jet aircraft 10. Ice protection elements 2 are provided on the leading edges of the wings 12, the empennage 14 and 16 and the engines 18.

Figure 4:
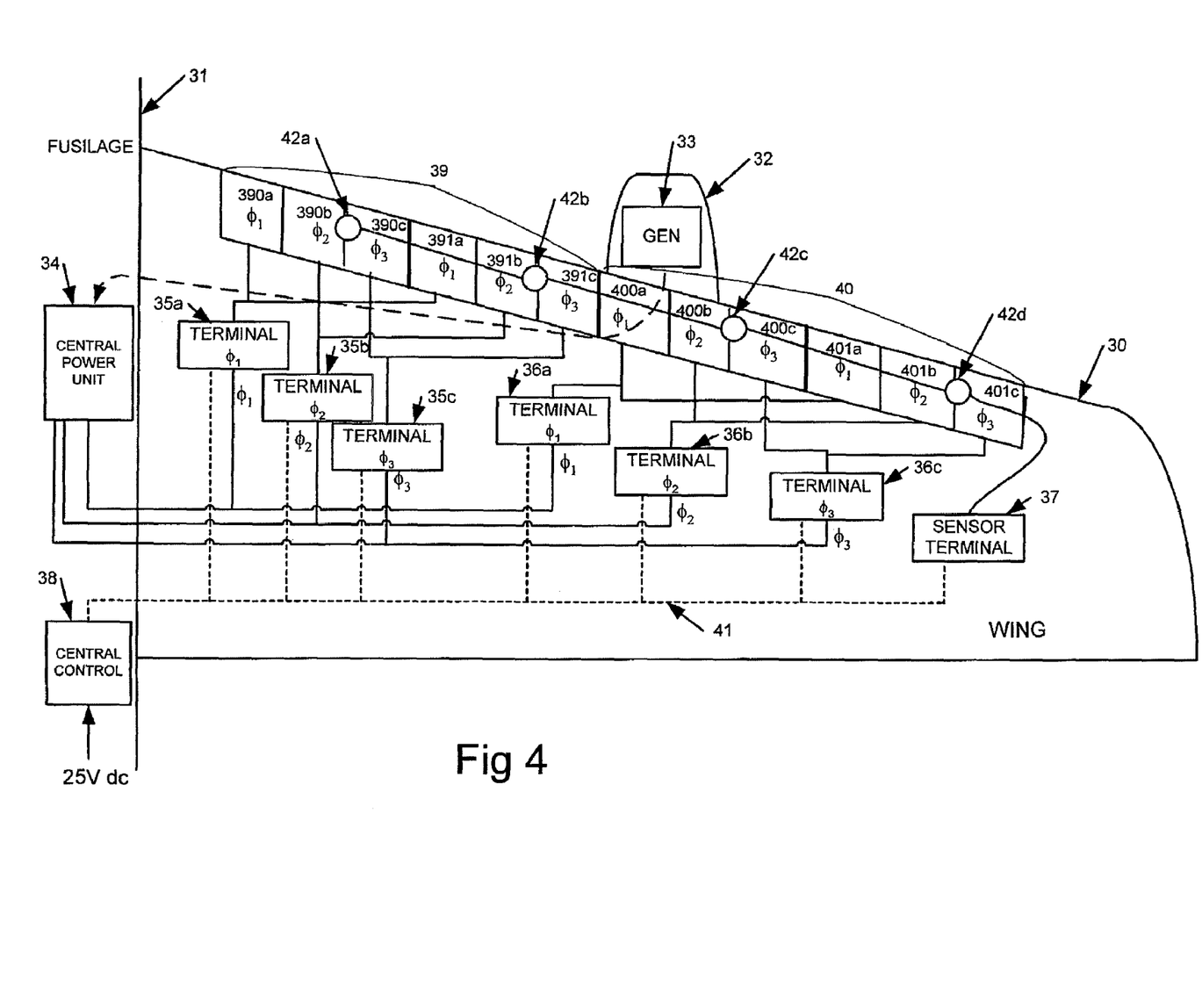
FIG. 4 is a schematic diagram of an ice protection system in accordance with one embodiment of the present invention.

FIG. 4 illustrates an ice protection system for a wing 30 of an aircraft in accordance with one embodiment of the present invention. In this diagram the system is only illustrated in one wing. Of course, the system components in the wing 30 are duplicated in the other wing. A central power unit 34 is provided within the fuselage 31 of the aircraft. The central power unit 34 receives power from the aircraft generators 33 provided in the engines 32 or from an Auxiliary Power Unit (not shown). The generated power is high power for high load devices in the aircraft. The common High Voltage Alternating Current (HVAC) standards are 115V ac 400 Hz, 115V ac Frequency wild (300 to 800 Hz) three phase, 230V ac frequency wild (300 to 800 Hz) three phase, and the High Voltage Direct Current (HVDC) 270V dc. However in some applications 28V dc or 42V dc may be preferred. In this example the central power unit 34 receives a 3-phase power supply from the generators 33 and this is supplied out on three phase power lines to local terminals (local control modules) 35a, 35b, 35c, 36a, 36b, and 36c. The terminals are provided for controlling two zones 39 and 40. Three terminals 35a, 35b, and 35c for controlling a first zone 39 each receive a single phase supply and control the application of power to two respective ice protection elements 390a, 390b, 390c, 391a, 391b, and 391c. The other three terminals 36a, 36b, and 36c for controlling the second zone 40 each receive a single phase supply and control the application of power to two respective ice protection elements 400a, 400b, 400c, 401a, 401b, and 401c. Thus in this embodiment the application of power by each phase in each zone can be separately controlled.

The central control unit 38 is provided with power from the aircraft's low voltage dc power supply. There are many standards and in this example the supply is 28V dc. The central control unit 38 is connected to each of the terminals 35a, 35b, 35c, 36a, 36b, and 36c by a combined power and data bus 41. This enables the central control unit 38 to control the terminals 35a, 35b, 35c, 36a, 36b, and 36c and to receive data from them on operating parameters of the ice protection elements 390a, 390b, 390c, 391a, 391b, 391c, 400a, 400b, 400c, 401a, 401b, and 401c, such as temperature, current and voltage. Also this enables the central control unit 38 to provide power to the terminals separately from the high power three-phase supply. This is particularly useful since it enables the terminals to be powered during a failure of the three-phase supply and thus they are able to detect a power failure and signal this to the central control unit 38. The provision of power by the central control unit 38 over the combined power and data bus 41 to the terminals also enables the system to be run and tested without the need for the aircraft's generators to be running i.e. without the need for the aircraft's engines to be running or the auxiliary power unit. This is of great benefit since it enables the system to be tested as a whole by ground crew.

Each of the zones 39 and 40 is provided with ice detectors 42a, 42b, 42c, and 42d. In this example only one detector is provided for all three of the ice protection elements controlled by a single terminal. However there can be a single detector provided for each ice protection element. The signals from the ice detectors are received by a sensor terminal 37 provided within the wing 30. The sensor terminal 37 is connected to the central control unit 38 by the combined power and data bus 41 so that the sensor measurements can be used by the central control unit 38 for determining the control of the terminals to in turn control the application of power to the ice protection elements.

In operation, the system central control unit performs control to substantially balance the power drawn by each of the phases. Also the terminals are controlled to cycle the power to each zone in turn. Thus in this embodiment the power is cycled to each of the four zones of the wings so that there is a continuous mean power demand rather than high peak loads followed by periods of zero power as the de-icing requirements vary.

In FIG. 4 the ice protection elements shown are de-icing elements of the heating kind. Also provided and not shown are anti-icing elements which are substantially continuously powered and provided along the stagnation point of the wings leading edge. One anti-icing element is provided in association with one de-icing element in this embodiment although the present invention is not in any way limited to this relationship and any number and anti-icing elements can be provided. The provision of the anti-icing elements along the stagnation point of the wings ensures that there is no build up of ice in this area, thus allowing the de-icing elements either side of the stagnation point, i.e. on upper and lower leading edges of the wings, to effectively remove built up ice.

The anti-icing elements can be controlled by switching the power applied to them on and off in order to control the level of power provided to keep them at the temperature sufficient to perform their anti-icing function. The de-icing elements 390a, 390b, 390c, 391a, 391b, 391c, 400a, 400b, 400c, 401a, 401b, and 401c are only required to be powered when ice has built up and is to be removed. Thus the zonal cycling of the application of power to these elements can be used in order to reduce peak power demand and to provide a more smooth continuous power demand from the aircraft's generator system. The control of de-icing by the central control unit 38 can be manually controlled e.g. by the pilot, or it can be automatic, based on the detected build up of ice by the ice detectors 2a, 42b, 42c and 42d.

Although FIG. 4 only shows one combined power and data bus 41, the preferred embodiment includes two such busses for redundancy.

Figure 5:
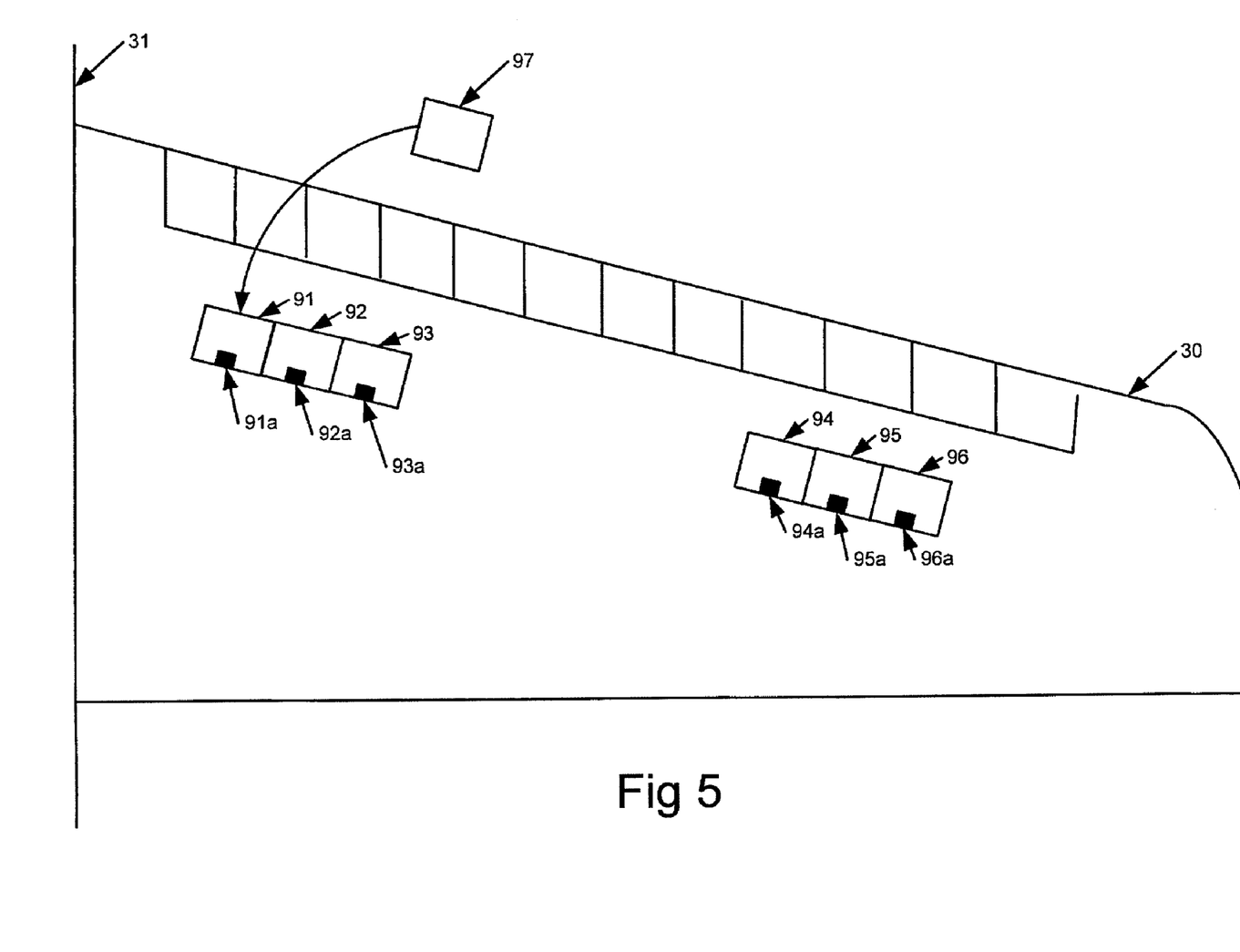
FIG. 5 is a schematic diagram of the physical location of the modules in the embodiment of FIG. 4.

The terminals 390a, 390b, 390c, 391a, 391b, 391c, 400a, 400b, 400c, 401a, 401b, and 401c are mounted in avionics racks within the wings. FIG. 5 shows the mounting of the racks 91, 92, 93, 94, 95, and 96 in the wing 30. The racks comprise housings for receiving standard control modules 97. Each rack 91, 92, 93, 94, 95, and 96 includes a respective storage module 91a, 92a, 93a, 94a, 95a, and 96a storing information for the configuration of the control module 97 as a terminal for local control. The control module 97 includes means for obtaining the information. This can comprise a device for reading the storage module or for receiving information transmitted by the storage module to the control module 97. The information can include address information to configure the control module 97 to communicate with the central control unit 38 using a particular address, and it can include power information indicating the power to be applied to the ice protection elements. The reason for this is that the ice protection elements need not be all the same and their power requirements may vary. Thus a standard control module needs to be programmed to apply the correct power to the element it is controlling. This arrangement provides for the use of standard control modules thus making the modular system easy to maintain. If a control module fails, it can be replaced with any standard control module, thus reducing the number of spares that need to be kept. In one embodiment the storage module comprises an rf tag. Such a tag can be passive or active. Alternatively a solid state memory device can be used and read by connection with the control module 97. The control module 97 is thus configured by the information obtained from the storage device.

Although in this embodiment the storage modules are illustrated as being within the housings, the storage modules can instead be provided on connector leads of connectors for connection to the control modules 97.

Figure 6:
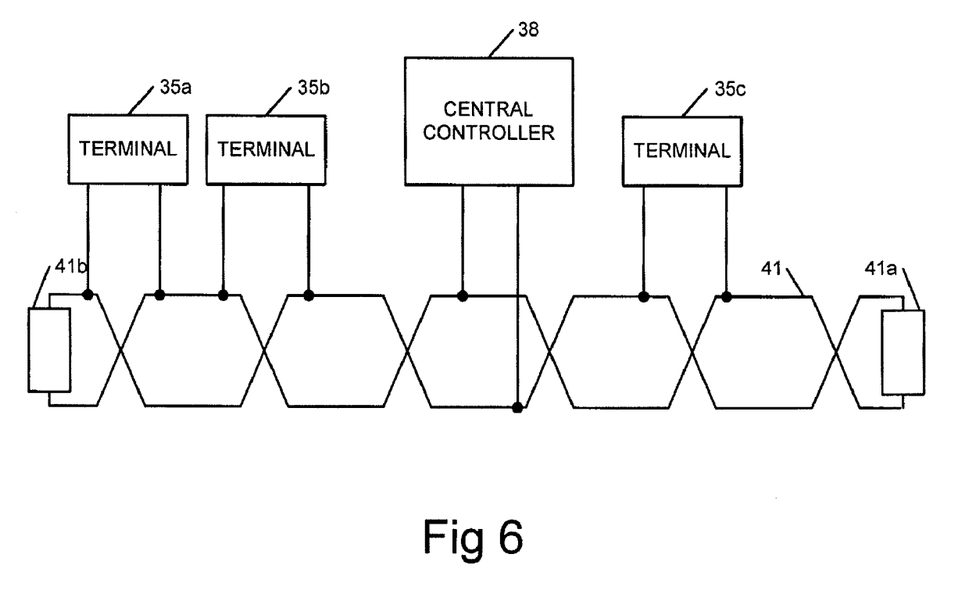
FIG. 6 is schematic diagram of the ice protection system showing the coupling of the components to the low power and communication line.

FIG. 6 illustrates the control of the system in this embodiment and shows the communication between the terminals 35a, 35b and 35c and the central control unit 38 over the combined power and data bus 41. The combined power and data bus 41 comprises a twisted pair cable with impedance terminations 41a and 41b to prevent signal reflections. The terminals 35a, 35b and 35c and the central control unit 38 are inductively coupled to the combined power and data bus 41.

Figure 7:
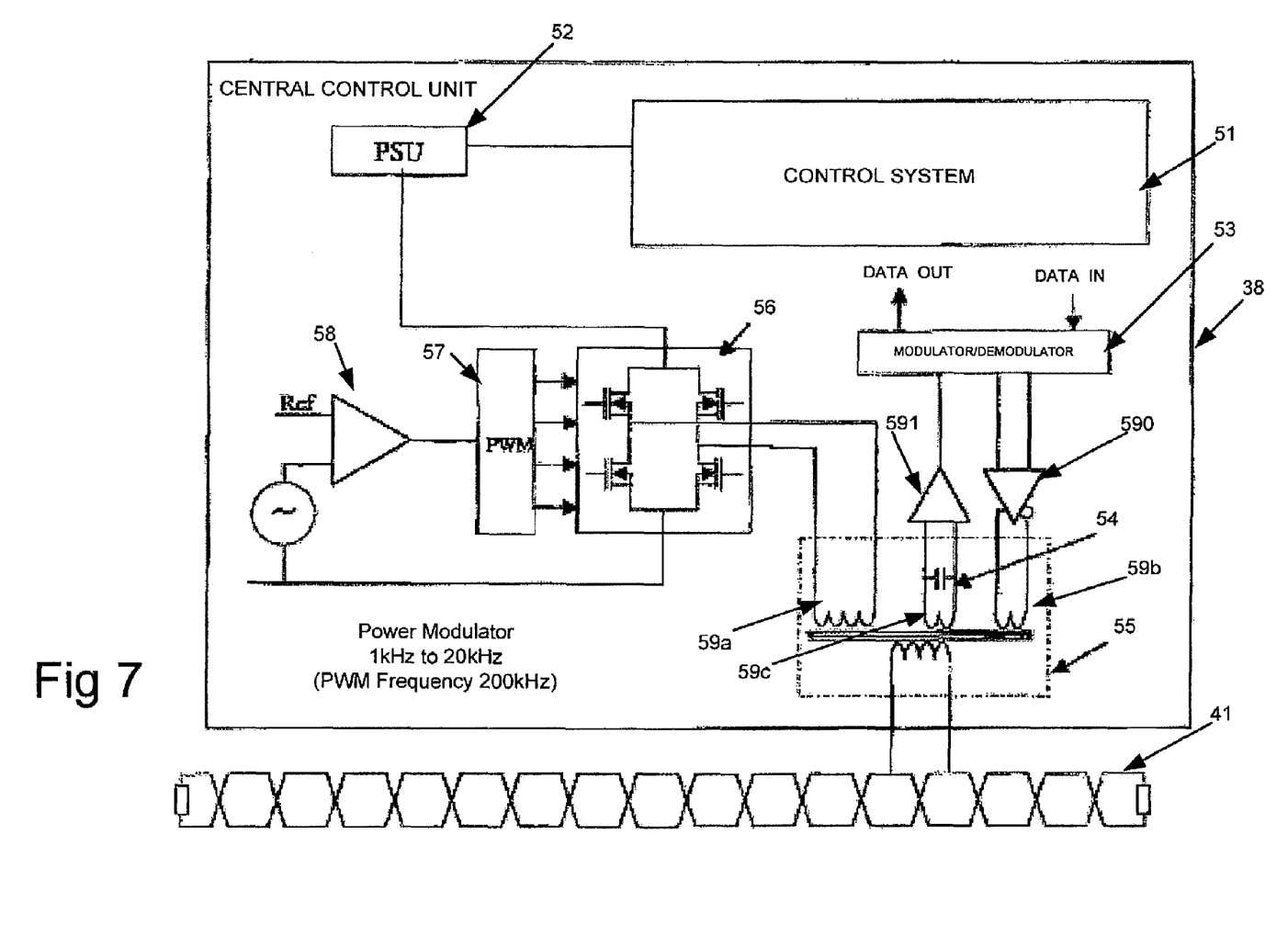
FIG. 7 is a schematic diagram of the central controller in the ice protection system of FIG. 4.

FIG. 7 illustrates the central control unit 38 in more detail. A transformer 55 is provided for inductive coupling to the bus 41. A first winding 59a provides the means for coupling power to the bus 41 from a H bridge 56, pulse width modulator 57 and reference ac power source 58. The ac power is provided at 1 kHz and 42V peak with a sinusoidal form at a load of 2 A. The power supply unit provides 28V dc from the aircraft's battery supply to the H bridge which provides an output of 21V peak which is doubled using the transformer 55 as a power transformer with a 1:2 turns ratio.

The transformer 55 is also provided with a data transmission coil 59b. A driver 590 is provided to drive the coil 59b by amplifying signals received from a modulator 53. The modulator 53 modulates signals it receives from a control system 51. The control, system outputs data as serial data at 1 kbits/s. The modulator 53 FSK modulates each data bit with a centre frequency of 118 kHz such that a "1" is represented by a frequency of 125 kHz and a "0" is represented by a frequency of 111 kHz. This signal is combined with the 1 kHz power signal by the transformer 55.

The transformer 55 is also provided with a third coil 59c and a tank circuit 54 for filtering the signal. An amplifier 591 amplifies the filtered signal and the demodulator 53 demodulates the signal for input to the control system 51 as serial data.

The control system 51 is a programmable controller that interfaces to other aircraft systems and includes program code for processing the received serial data and for generating control serial data. The received serial data will comprise detected parameters from the terminals. The transmitted serial data will comprise instructions for the control of the switching of the power to the ice protection elements. The data transmission protocol used for transmission on the bus is TDMA. Each controller is addressed by a time slot in the communications. Thus data is received from the terminals and control data is transmitted to the terminals during their respective time frames.

Figure 8:
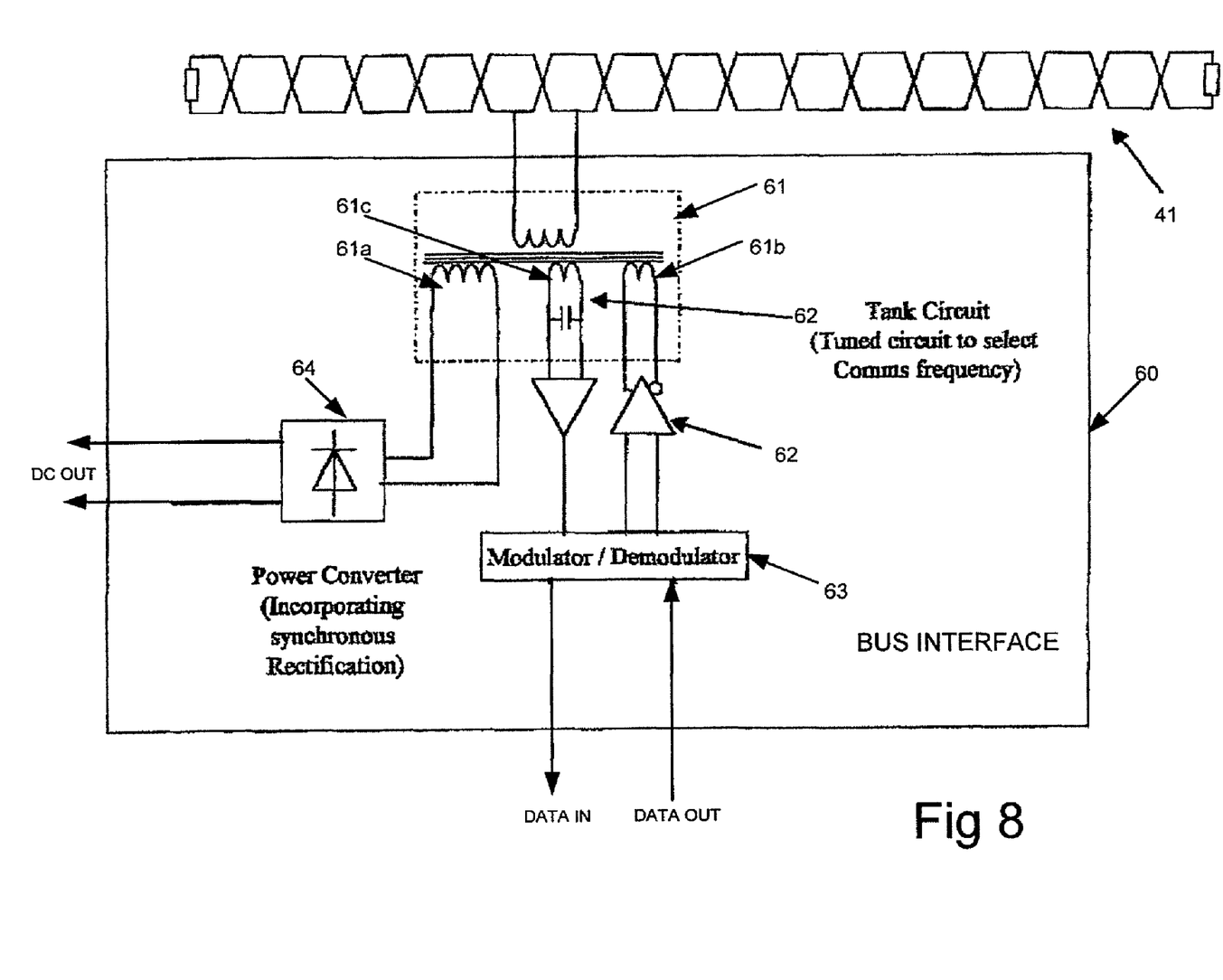
FIG. 8 is a schematic diagram of the bus interface of a local control module in accordance with an embodiment of the present invention.

FIG. 8 illustrates the structure of a bus interface 60 in a terminal. A transformer 61 is coupled to the bus 41. A first winding 61a of the transformer 61 is used for receiving power which is converted to dc using a power converter 64 and used to provide power for the terminal. The transformer 61 is provided with a second winding 61b for the transmission of data to the central control unit 38. A modulator/demodulator 63 modulates serial data using the same FSK method as described above for the central control unit 38. The modulated data is amplified by the amplifier 64 and the second winding 61b couples the modulated signal onto the bus 41. The transformer is provided with a third winding 61c in a tank circuit 62 tuned to select the communication (modulation) frequency. An amplifier 65 amplifies the signal and the modulator/demodulator 63 demodulates the signal to provide serial data input to the terminal from the central control unit 38 to control the operation of the terminal.

Figure 9:
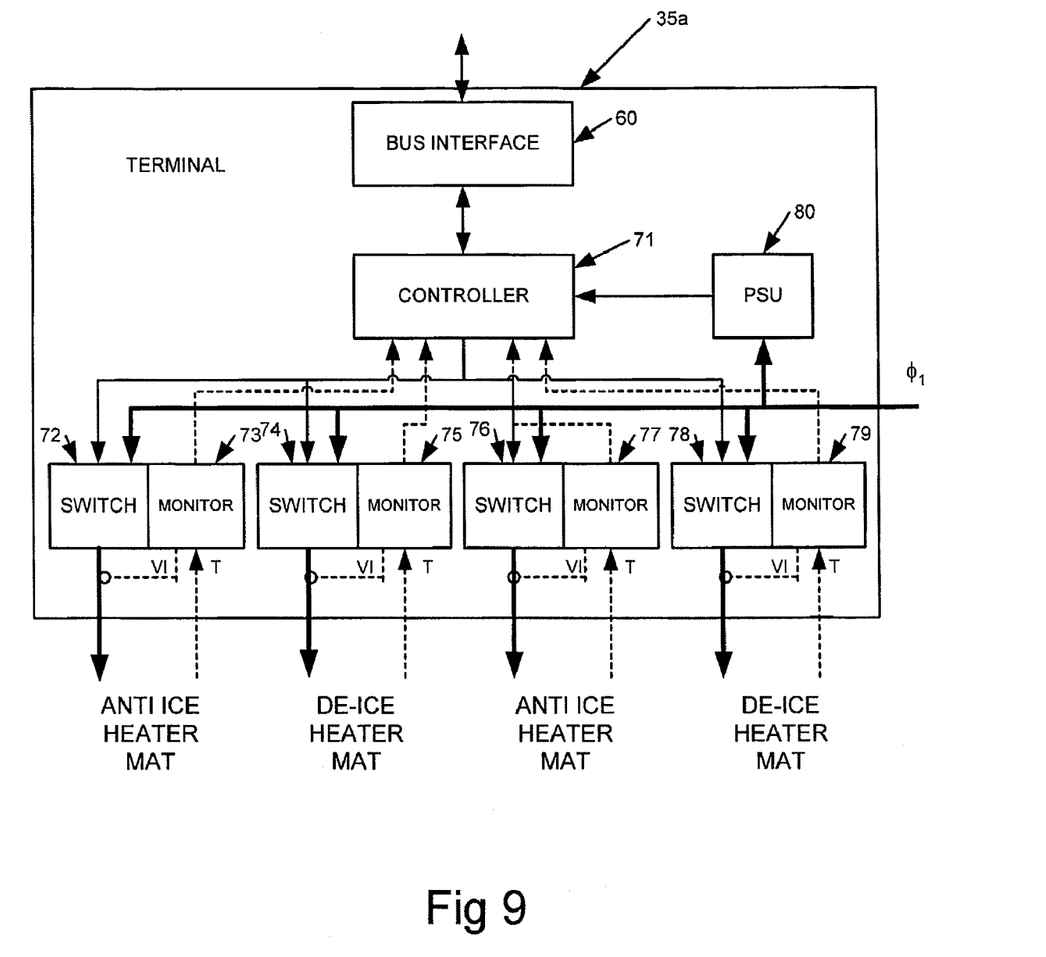
FIG. 9 is a schematic diagram of a local control module in accordance with an embodiment of the present invention.

FIG. 9 illustrates the structure of the terminal 35a in the embodiment of the present invention. In this embodiment all terminals are identical. The bus interface 60 of FIG. 8 provides an interface for communication with the central control unit 38 and a means by which power can be extracted from the bus 41. A controller 71 controls the operation of the terminal in accordance with the received control instructions. The operation of the controller 71 is governed by the operating parameters received from the rack when the standard module is placed in the rack.

In this embodiment the terminal 35a controls two de-icing elements and two anti-icing elements. Two switches 72 and 76 control the application of power to the anti-icing elements. Two switches 74 and 78 control the application of power to the de-icing elements. Each switch has associated with it a monitor unit 73, 75, 77 and 79. Each monitor unit monitors the current and voltage of the supply to the element and it receives a signal from the element indicative of the operating temperature of the element. These parameters are transmitted to the controller 71 for use in local control decisions and for transmission to the central control unit 38 via the bus interface 60 and the bus 41. Each switch 72, 74, 76, and 78 received high voltage power (a single phase $\phi_1$ of the three phase ac) from the aircraft's power generation system via a power line. Thus the switches 72, 74, 76, and 78 switch the power to the ice protection elements.

The terminal 35a is also provided with a power supply unit 80 for taking power from the ac power line $\phi_1$ and providing dc power to the terminal. The terminal 35a thus has two potential power sources: the power from the bus 41 and the power from the ac power line $\phi_1$. In a preferred embodiment the terminal normally takes the power from the 230V ac power line since this is renewable generated power and thus calling on the aircraft's batteries is avoided. The power supply from the bus 41 in this case acts as an emergency supply in case of failure of the main supply so as to be able to signal such a failure to the central control unit 38. Also the provision the power from the bus 41 enables the system to be tested without the need for the generators to be running.

Although the embodiment of the present invention has been described with reference to a specific embodiment, the present invention is not limited to this embodiment.

The high power can be any convenient ac power supply such as High Voltage Alternating Current (HVAC) standards such as 115V ac 400 Hz, 115V ac Frequency wild (300 to 800 Hz) three phase, 230V ac frequency wild (300 to 800 Hz) three phase, or any convenient dc power supply such as High Voltage Direct Current (HVDC) 270V dc, 28V dc or 42V dc.

In an embodiment of the present invention, either the ac or dc power can be cyclically applied to the control modules to spread the application of power and to avoid power spikes caused by switching on and off all of the devices at once.

In an alternative embodiment of the present invention, a three phase power inverter can provide power to the control modules as a low power three-phase supply and a conventional data bus can be used such as a CAN (Controller Area Network) Bus or TTP (Time Triggered Protocol) or any other recognised avionic serial data bus standard such as ARINC 429, ARINC 629, MIL-STD-1553A/B, MIL-STD-1773 or AFDX.

In an alternative embodiment of the present invention, the sensor terminal could be provided within at least one of the local control modules controlling the application of power to the devices.

Although the embodiment of the present invention has been described with reference to the application of the present invention to an ice protection system, the present invention is not limited in its broadest application to an ice protection system. The present invention can be used as a control system for any aircraft system comprising distributed devices.

Modifications that lie within the spirit and scope of the present invention will be apparent to a skilled person in the art.

Therefore, having thus described the invention, at least the following is claimed:

1. An aircraft ice protection system comprising:
   a plurality of ice protection elements for preventing ice formation and/or removing ice;
   a plurality of local control modules, each said local control module being configured to control the application of power to a group of at least one ice protection element; and
   a central control system to control said local control modules to control the application of power by each said local control module to a respective said group of said at least one ice protection element,
   wherein each local control module includes at least one monitor unit to monitor the operating parameters of said group of said at least one ice protection element and to send operating parameter data to said central control system, the operating parameters including the temperature of at least one of said ice protection elements, and said central control system includes an interface to receive the operating parameter data for use by said central control system to control said local control modules in dependence upon the received operating parameter data.

2. An aircraft ice protection system according to claim 1, wherein said central control system controls said local control modules to allow the separate application of power by each said local control module to a respective said group of said at least one ice protection element.

3. An aircraft ice protection system according to claim 1, wherein each said local control module arranged in the vicinity of said group of said at least one said ice protection element.

4. An aircraft ice protection system according to claim 1, wherein said local control modules are configured to receive power to be applied to said group of said at least one ice protection element from an ice protection power line.

5. An aircraft ice protection system according to claim 1, wherein said central control system is configured to control said local control modules to apply power to said ice protection elements cyclically.

6. An aircraft ice protection system according to claim 1, wherein said central control system is configured to control said local control modules to apply power to said ice protection elements cyclically so as to keep the total power applied to said ice protection elements substantially constant.

7. An aircraft ice protection system according to claim 1, including a local control module power line to provide power to said local control modules, wherein said local control modules are configured to receive power from said local control module power line.

8. An aircraft ice protection system according to claim 7, wherein said local control module power line is configured to carry data between said central control system and said local control modules, said central control system is configured to send control data to said local control modules over said local control module power line, and said local control modules are configured to receive control data and power over said local control module power line.

9. An aircraft ice protection system according to claim 8, wherein said local control modules are configured to receive said operating parameters of said group of said at least one ice protection element and to send said operating parameter data over said local control module power line to said central control system, and said central control system is configured to receive said operating parameter data from said local control module power line control and to control said local control modules in dependence upon the received operating parameter data.

10. An aircraft ice protection system according to claim 1, wherein said group of at least one ice protection elements comprises at least one said ice protection element to prevent ice formation and at least one said ice protection element for removing ice, and each said local control module is configured to control the application of power to said at least one ice protection element to prevent ice formation separately from the application of power to said at least one ice protection element to remove ice.

11. An aircraft ice protection system according to claim 10, wherein each said local control module is configured to substantially continuously apply power to said at least one ice protection element to prevent ice formation under the control of said central control system when said ice protection system is in an active state, and to apply power to said at least one ice protection element to remove ice under the control of said central control system when de-icing is required.

12. An aircraft ice protection system according to claim 11, including at least one ice detector to detect the presence of ice, wherein said central control system is configured to control said local control modules to apply power to said at least one ice protection element to remove ice when said at least one ice detector detects the presence of ice.

13. An aircraft comprising the ice protection system according to claim 1, and an ice protection power line connected to each said local control module to provide the power to be applied to said ice protection elements.

14. An aircraft ice protection system comprising:
  a plurality of ice protection elements for preventing ice formation and/or removing ice;
  a plurality of local control modules, each said local control module being configured to control the application of power to a group of at least one ice protection element; and
  a central control system to control said local control modules to control the application of power by each said local control module to a respective said group of said at least one ice protection element,
  wherein said power has a plurality of phases, each of a plurality of groups of said local control modules are configured to control the application of power to a plurality of groups of at least one said ice protection element provided in an ice protection zone, the number of said local control modules in each group and the number of groups of said at least one ice protection element corresponding to the number of power phases, a said local control module of a said group is configured to control the application of power of a said phase to a said group of said at least one ice protection elements, and said central control system is configured to control said local control modules to apply power to said ice protection elements in each zone.

15. An aircraft ice protection system according to claim 14, wherein said central control system is configured to control said local control modules to apply power to said ice protection elements in each ice protection zone so as to substantially balance the power applied for each phase.

16. An aircraft ice protection system according to claim 14, wherein said central control system is configured to control said local control modules to apply power to said ice protection zones cyclically.

17. An aircraft ice protection system according to claim 14, wherein said central control system is configured to control said local control modules to apply power to said ice protection zones cyclically so as to keep the total power applied to said ice protection zones substantially constant.

18. An aircraft ice protection system according to claim 14, wherein the number of power phases equals three.

19. An aircraft system for control of the application of power from a central high power source to a plurality of devices in the aircraft, the system comprising:
  a plurality of local control modules connected to said central high power source over a high power line, each local control module including a control unit to control the application of said high power to a group of at least one said device;
  a low power line connected to said local control modules to provide power to operate said local control modules; and
  a central control system connected to said low power line to apply power to said low power line and to communicate with and control said local control modules over said low power line,
  wherein said central control system includes an induction unit to inductively apply power and control signals to said low power line, and each local control module includes an inductive coupling unit to receive the induced control signals from said low power line.

20. An aircraft system according to claim 19, wherein said local control modules include an interface to receive said power from said low power line.

21. An aircraft system for control of the application of power to a plurality of devices in the aircraft, the system comprising:
  a plurality of local control modules, each local control modules to control the application of said power to said group of at least one device;
  a plurality of local control module connection arrangements, each said local control module connection arrangement being configured to connect to a said local control module;
  a communication line connected to said local control module connection arrangements; and
  a central control system configured to communicate with and to control said local control modules over said communication line;
  wherein each said local control module connection arrangement includes a storage device storing information to configure the operation of a said local control module, and each said local control module includes an arrangement to obtain the information in said storage device to configure said local control module.

22. An aircraft system according to claim 21, wherein said arrangement is configured to read said storage device.

23. An aircraft system according to claim 21, wherein said storage device is configured to transmit said information and said arrangement is configured to receive the transmission from said storage device.

24. An aircraft system according to claim 21, wherein said storage device stores address information, said local control modules are configured to be configured to receive communications from said central control system over said communications line using said address information.

25. An aircraft system according to claim 21, wherein said information includes power information, and said local control modules are configured to control the application of said power to said group of at least one device in accordance with said power information.

* * * * *